(12) United States Patent
Skinner

(10) Patent No.: US 11,855,583 B2
(45) Date of Patent: Dec. 26, 2023

(54) SOLAR-POWERED PROTECTIVE CAR CHARGING COVER

(71) Applicant: Common Tech Corp, Tucson, AZ (US)

(72) Inventor: Mark Edward Skinner, Tucson, AZ (US)

( * ) Notice: Subject to any disclaimer, the term of this patent is extended or adjusted under 35 U.S.C. 154(b) by 0 days.

(21) Appl. No.: 17/571,528

(22) Filed: Jan. 9, 2022

(65) Prior Publication Data
US 2023/0223896 A1  Jul. 13, 2023

(51) Int. Cl.
| | |
|---|---|
| H02S 30/20 | (2014.01) |
| H02J 9/06 | (2006.01) |
| H02S 40/34 | (2014.01) |
| B60J 11/04 | (2006.01) |
| H02S 40/38 | (2014.01) |
| B60L 53/51 | (2019.01) |
| B60L 53/30 | (2019.01) |

(52) U.S. Cl.
CPC ............... *H02S 30/20* (2014.12); *B60J 11/04* (2013.01); *H02J 9/061* (2013.01); *H02S 40/34* (2014.12); *H02S 40/38* (2014.12); *B60L 53/30* (2019.02); *B60L 53/51* (2019.02); *H02J 2207/20* (2020.01)

(58) Field of Classification Search
CPC ........ H01L 31/00–078; Y02E 10/50–60; B60J 11/00–10; H02S 20/00–32; H02S 40/30–38
USPC .................. 136/243–265; 296/136.01–136.13
See application file for complete search history.

(56) References Cited

U.S. PATENT DOCUMENTS

| | | | | |
|---|---|---|---|---|
| 4,795,207 A | * | 1/1989 | Clarke .................... | B60J 11/00 296/136.03 |
| 5,738,403 A | * | 4/1998 | Tyson ...................... | B60J 11/06 296/136.04 |
| 2019/0255927 A1 | * | 8/2019 | Georges .................... | B60J 11/04 |
| 2020/0266759 A1 | * | 8/2020 | Okawa ................. | H01R 12/585 |

FOREIGN PATENT DOCUMENTS

| | | | |
|---|---|---|---|
| CN | 104875590 | * | 9/2015 |
| CN | 209653538 U | * | 11/2019 |

OTHER PUBLICATIONS

CN104875590 English translation (Year: 2015).*

* cited by examiner

*Primary Examiner* — Bach T Dinh
(74) *Attorney, Agent, or Firm* — James D. Stevens

(57) ABSTRACT

A system for a solar-powered protective car charging cover. The solar-powered car charging cover is designed to directly trickle charge electric cars by bypassing the internal charging power supply whilst also providing a protective barrier around the vehicle. This trickle charge provides enough power for charging cellular phones, powering lights, and other small electronics without further draining the battery and may even produce a net-positive charge to charge the vehicle's batteries. The barrier portion is a multi-layer cover with an adjustable-rigid air bladder layer sandwiched between an outer solar-panel layer and an inner vehicle paint protection layer. Zippered portions provide multiple configurations including using the solar-powered car charging cover without a vehicle for a make-shift tent with solar-powered charging ports. A power control box provides the means to connect external power sources to the solar-powered car charging cover.

16 Claims, 7 Drawing Sheets

SOLAR-POWERED PROTECTIVE CAR CHARGING COVER

CROSS-REFERENCE TO RELATED APPLICATIONS

None.

BACKGROUND

Field of the Art

The disclosure relates to the field of electronic vehicle accessories, and more particularly to the field of solar-powered vehicle accessories.

Discussion of the State of the Art

The market for electric vehicles (EV) has significantly increased over the last few years, as demonstrated by the fact that nearly all vehicle manufacturers are now producing some variant of electric vehicle. This has led to a small but growing market of EV accessories, and although solar panel technology has also made significant strides since years past, it has yet to be integrated into many EV accessories.

What is needed is a multi-use electric vehicle accessory that provides power and shelter for a wide range of applications.

SUMMARY

Accordingly, the inventor has conceived and reduced to practice, a system for a solar-powered protective car charging cover. The solar-powered car charging cover is designed to directly charge electric cars by bypassing the internal charging power supply whilst also providing a protective barrier around the vehicle. The barrier portion is a multi-layer cover with an adjustable-rigid air bladder layer sandwiched between an outer solar-panel layer and a soft inner vehicle paint protection layer. The power generated from the solar panels can be used to inflate the bladder layer, charge mobile devices, power lights and other small electronics, and charge batteries. Zippered portions of the barrier provide multiple configurations including using the solar-powered car charging cover without a vehicle for a make-shift tent with available DC power. A power control box provides the means to connect external power sources to the solar-powered car charging cover.

According to one aspect, a solar-powered protective car charging cover is disclosed, comprising: a multi-layer vehicle cover comprising; a first outer most layer constructed of a durable weatherproof material; a second middle layer constructed of a network of inflatable tubes; and a third inner most layer constructed of a soft durable material; a solar panel array attached to the first outer most layer; wherein the wires of the solar panel array are routed through the second middle layer to a charge controller; and an electronics box comprising the charge controller, a charging cable, and an air pump; wherein the charge controller provides power to the charging cable and the air pump; and wherein the air pump is connected to and inflates the second middle layer.

According to one aspect, the solar panel array comprises flexible solar panels capable of being rolled of folded.

According to one aspect, the solar panel array is detachable.

According to one aspect, the detachable solar panel array completes the circuit to the charge controller using a pair of dual contact pads on the back of the solar panel array and the top of the first outer most layer.

According to one aspect, the wires of the solar panel array are routed in-between the first and second layers.

According to one aspect, the wires of the solar panel array are routed in-between the first and second layers.

According to one aspect, the electronics box comprises a battery pack charged by the charge controller.

According to one aspect, the battery pack provides extra charge when needed.

According to one aspect, the electronics box comprises an inverter for supplying alternating current.

According to one aspect, the electronics box further comprises charging ports on the front side, backside, or both.

According to one aspect, the electronics box is accessible from both the outside and inside of the multi-layer car cover through a removable flap.

According to one aspect, the multi-layer car cover further comprises an opening on either side for vehicle mirrors to protrude though.

According to one aspect, the openings may be sealed closed by fastening a cover along the edge of the opening.

According to one aspect, the quarter panels of the multi-layer car cover are detachable.

According to one aspect, the edges of the multi-layer car cover can be fastened together after a detachable quarter panel has been removed.

According to one aspect, a plurality of grommets exists along the perimeter of the bottom edge of the multi-layer car cover.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
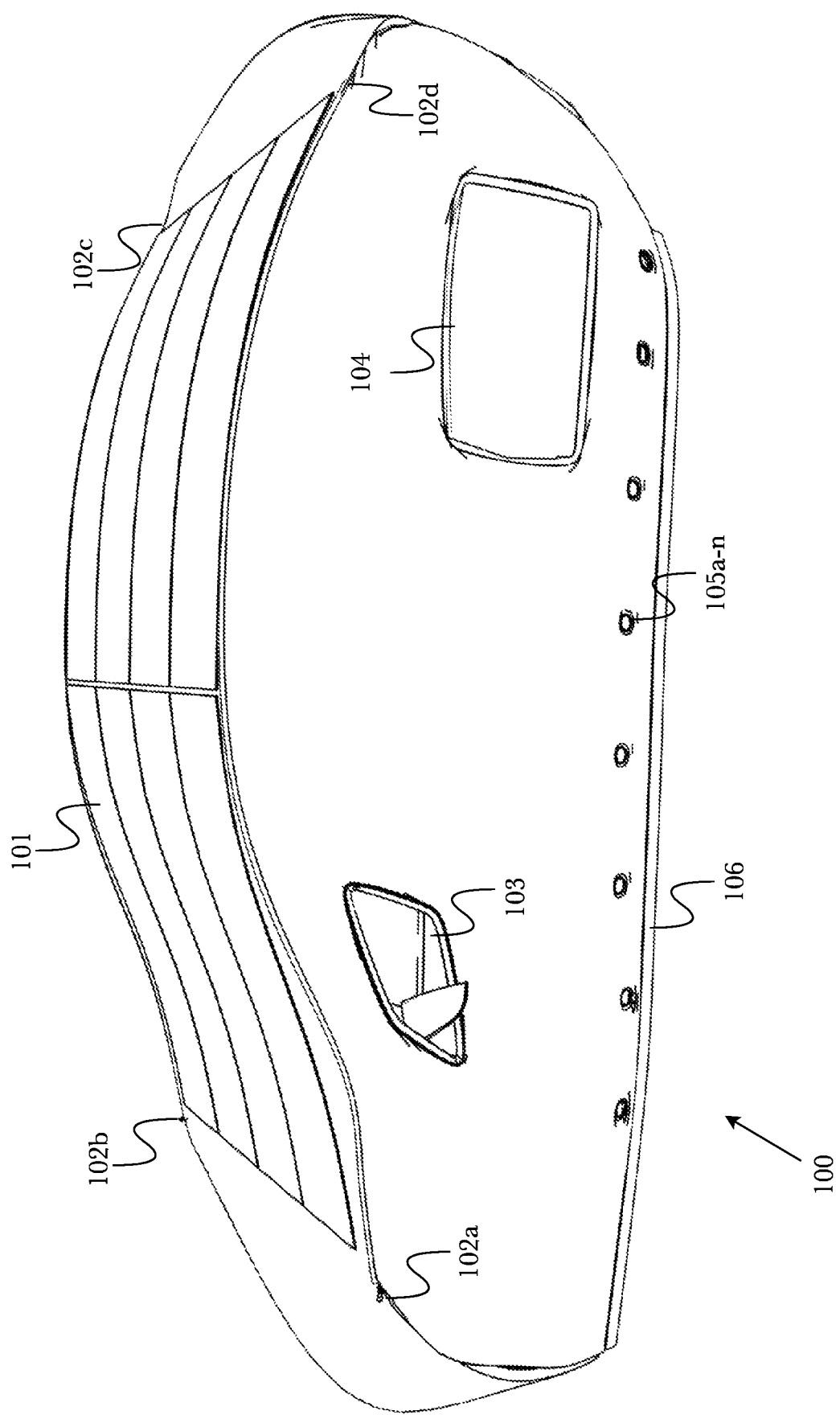
FIG. 1 is a side-view of a solar-powered protective car charging cover.

The inventor has conceived, and reduced to practice, a system for a solar-powered protective car charging cover. The solar-powered car charging cover is designed to directly trickle charge electric cars by bypassing the internal charging power supply whilst also providing a protective barrier around the vehicle. This trickle charge provides enough power for charging cellular phones, powering lights, and other small electronics without further draining the battery and may even produce a net-positive charge to charge the vehicle's batteries. The barrier portion is a multi-layer cover with an adjustable-rigid air bladder layer sandwiched between an outer solar-panel layer and an inner vehicle paint protection layer. Zippered portions provide multiple configurations including using the solar-powered car charging cover without a vehicle for a make-shift tent with solar-powered charging ports. A power control box provides the means to connect external power sources to the solar-powered car charging cover.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

DETAILED DESCRIPTION OF EXEMPLARY EMBODIMENTS AND ASPECTS

FIG. 1 is a side-view of a solar-powered protective car charging cover 100 (also referred to as, car cover 100). The solar-powered protective car charging cover 100 comprises a solar panel array 101, one or more zippers 102a-d, optional openings 103, electronic components and associated compartment 104, a plurality of grommets 105a-n, and weighted edges 106.

The solar panel array 101 may be permanently attached to the outer most layer of the car cover 100. The wires of each solar panel being routed in-between the outer most layer and the middle layer, or in-between a plurality of air tubes (see FIG. 3, component 302) in the middle layer. The solar panel wires in either embodiment leads into a power control box. In another embodiment, each solar panel in the array 101 may be removable, secured to the outer most layer of the car cover 100 by hook-and-loop fasteners, zippers, buttons, snaps, or another fastening means. The removable solar panels providing easy replacement of damaged panels, different storage configurations, and easily upgradable solar panels as solar technology improves. Removable solar panels may have electrical contact points on the backside of each panel such that when fastened to the car cover 100, the electrical contact points of a panel touch contact points on the outer layer of the car cover 100 which are connected to the wires that are routed to the power control box, in order to complete the circuit. The solar panel 101 array in either the permanent or detachable configurations may be wired in series, parallel, or some combination thereof to achieve a desired voltage or current level. The solar panel 101 array in either the permanent or detachable configurations may have rigid or flexible solar panels. The flexible solar panels designed to be rolled or folded along with the car cover 100.

One or more zippers 102a-d at each corner of the car cover 100 provide a quick and easy means to cover a vehicle and to store in a folded or rolled fashion. Optional openings 103 may be implemented into the car cover 100 for vehicles with large mirrors such as trucks or vehicles with mirrors that don't fold in. An electronic compartment 104 comprises the electrical components to manage and distribute the power generated from the solar array 101. The compartment 104 may have a fully removable outer and inner flap or may have a fastening means (e.g., zipper) running along three sides so the flap may be folded down exposing the electrical components. The components also comprising a cable that may be used for powering a battery or other device. A plurality of grommets 105a-n span the perimeter of the car cover along the bottom edge and may be used for securing the car cover. Edges 106 may be weighted to provide some resistance against gusts of wind potentially blowing the car cover 100 off. Edges 106 may also comprise one side of a hook-and-pile tape (or other fastening means) while the other side is parallel with the plurality of grommets 105a-n, such that the edge may be folded up to cover and protect the plurality of grommets 105a-n.

Figure 2:
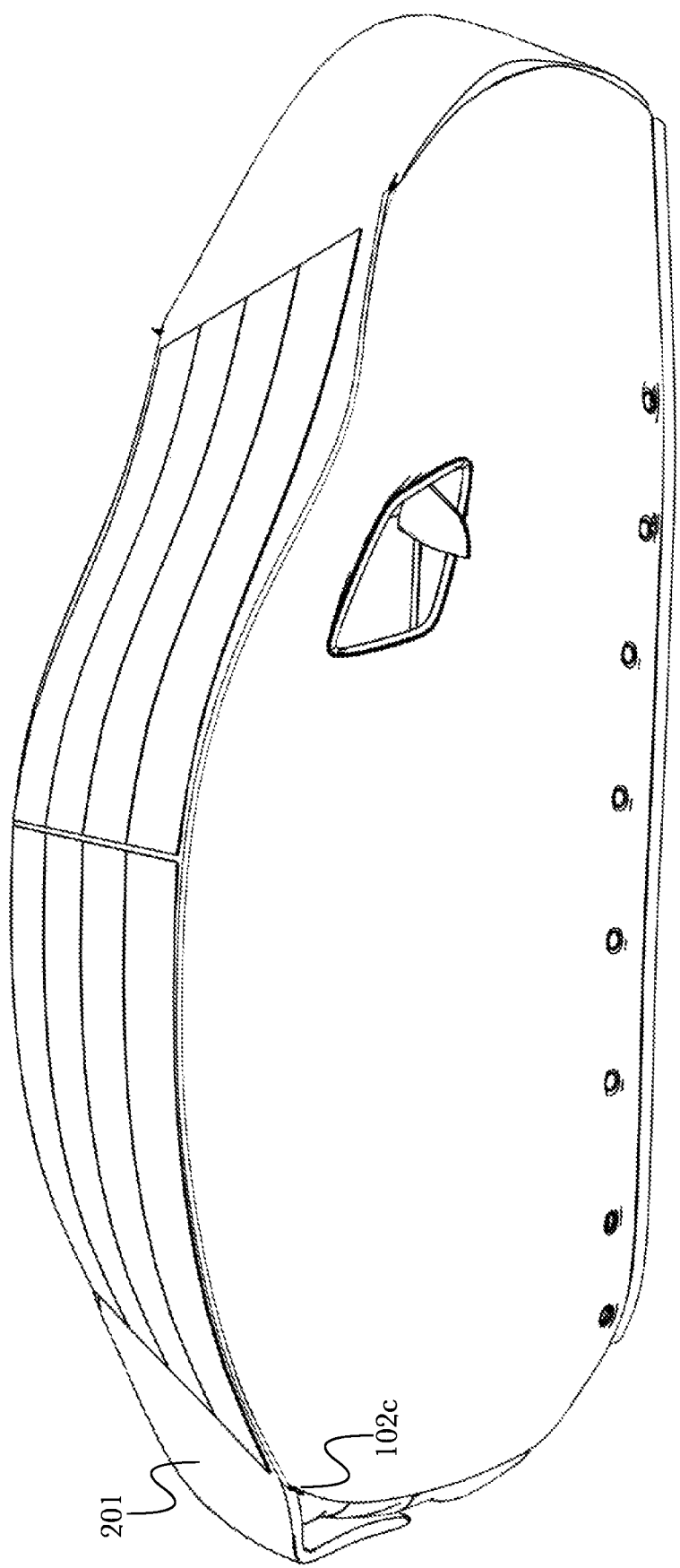
FIG. 2 is a diagram illustrating the zipper aspect of a solar-powered protective car charging cover.

FIG. 2 is a diagram illustrating the zipper aspect of a solar-powered protective car charging cover. The zippers 102a-d add a plurality of functions to the car cover 100, such as allowing the back flap 201 to lift separate from the rest of the car cover in order to access to the trunk. The same principle applies to accessing doors, frunks, EV charging ports, or the backside of the electronic compartment 104. The zippers 102a-d may also allow a car cover manufactured for a smaller vehicle to be adapted to a larger vehicle by unzipping one or more ends to extend the profile of the car cover 100, as seen in the diagram. Although this diagram and many embodiments contained herein utilize zippers, it is anticipated that any fastening means such as button snaps, hook-and-pile tape, etc. may take the place of zippers. Additionally, it is anticipated that zippers comprise any type of zippers such as metal zippers, invisible zippers, etc.

Figure 3:
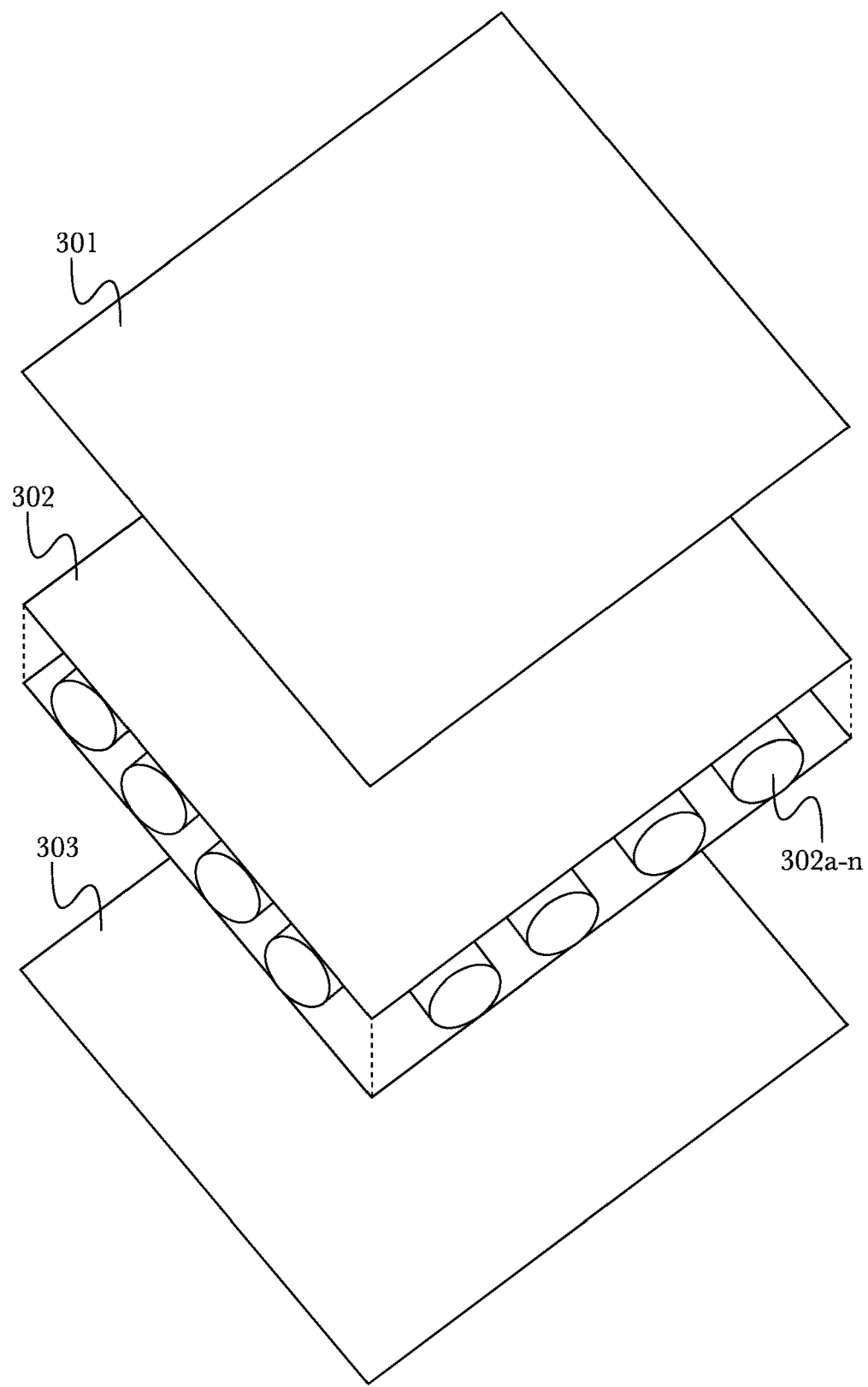
FIG. 3 is a diagram illustrating an exemplary multi-layer construction of a solar-powered protective car charging cover.

FIG. 3 is a diagram illustrating an exemplary multi-layer construction of a solar-powered protective car charging cover 100. The side of the top layer 301 that is exposed to the elements may be weatherproof and waterproof and constructed of durable materials such as Kevlar, plastic, or other flexible but durable material. The middle layer 302 comprises a pattern of air tubes 302a-n that may be inflated to various pressures for different applications. The pattern of air tubes may be in the form of a grid, crosshatch, zigzag, parallel lines, or other pattern that is possible to be formed by a plurality of air tubes 302a-n. The bottom layer 303, the layer in contact with the vehicle, is made of a soft but durable material that will not scratch or abrase the surface of the vehicle.

Figure 4:
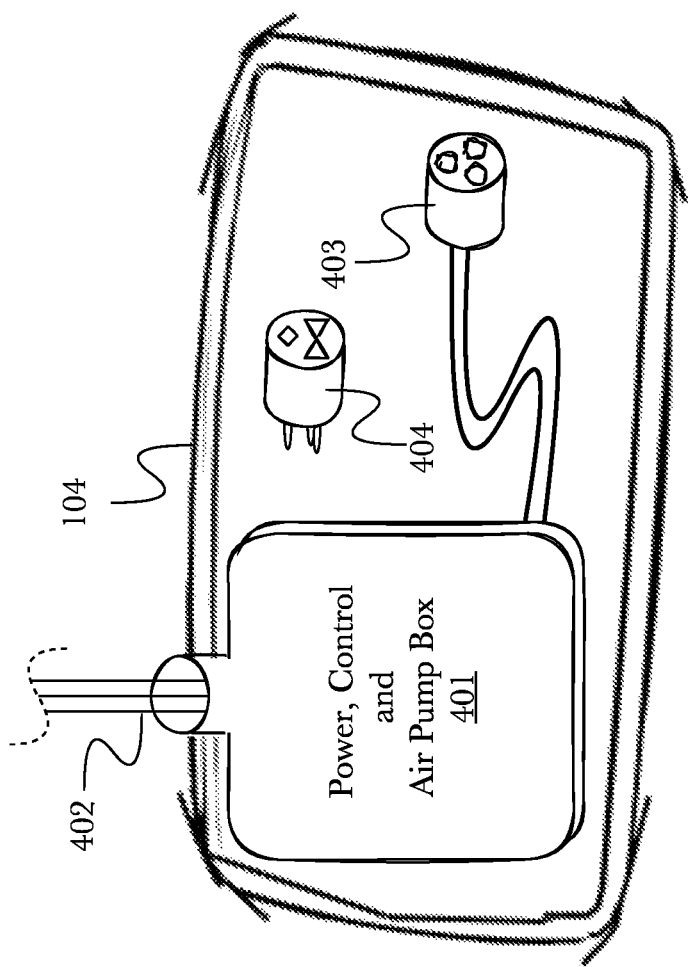
FIG. 4 is a diagram illustrating exemplary electrical components for a solar-powered protective car charging cover.

FIG. 4 is a diagram illustrating exemplary electrical components for a solar-powered protective car charging cover. The electronic compartment 104 of a car cover 100 may be a soft or hard pouch with a plastic or metal enclosure 401. The enclosure 401 comprising an opening to receive the solar panel array wires and middle-layer inflation tubes 402 and houses the power management electronics, control electronics, and an air pump. The power management and control electronics comprise the necessary components needed to charge an EV (including the charging cord 403 with adapters 404), charge a battery bank, or supply direct power to USB or other standard or proprietary ports. Some embodiments may also store a battery bank within the enclosure for use in various applications.

Other electronics within the power, control, and air pump box 401 comprise a wireless communication board such as Wi-Fi or Bluetooth module for use in communicating with an external computing system such as a server, vehicle computer, mobile device, etc. Commands may be sent and received between the communication board and external device to perform actions such as to begin or stop charging, monitor charge progress, monitor the car cover temperature (if equipped with temperature sensors), inflate the car cover 100, and perform software upgrades. This list of actions is not extensive and is not intended to be limited to all the possible actions that may take place between the car cover 100 and an external device.

According to another embodiment, the power, control, and air pump box 401 may have an input port for external power generation sources such as generators, wind turbines, and other solar arrays.

Figure 5:
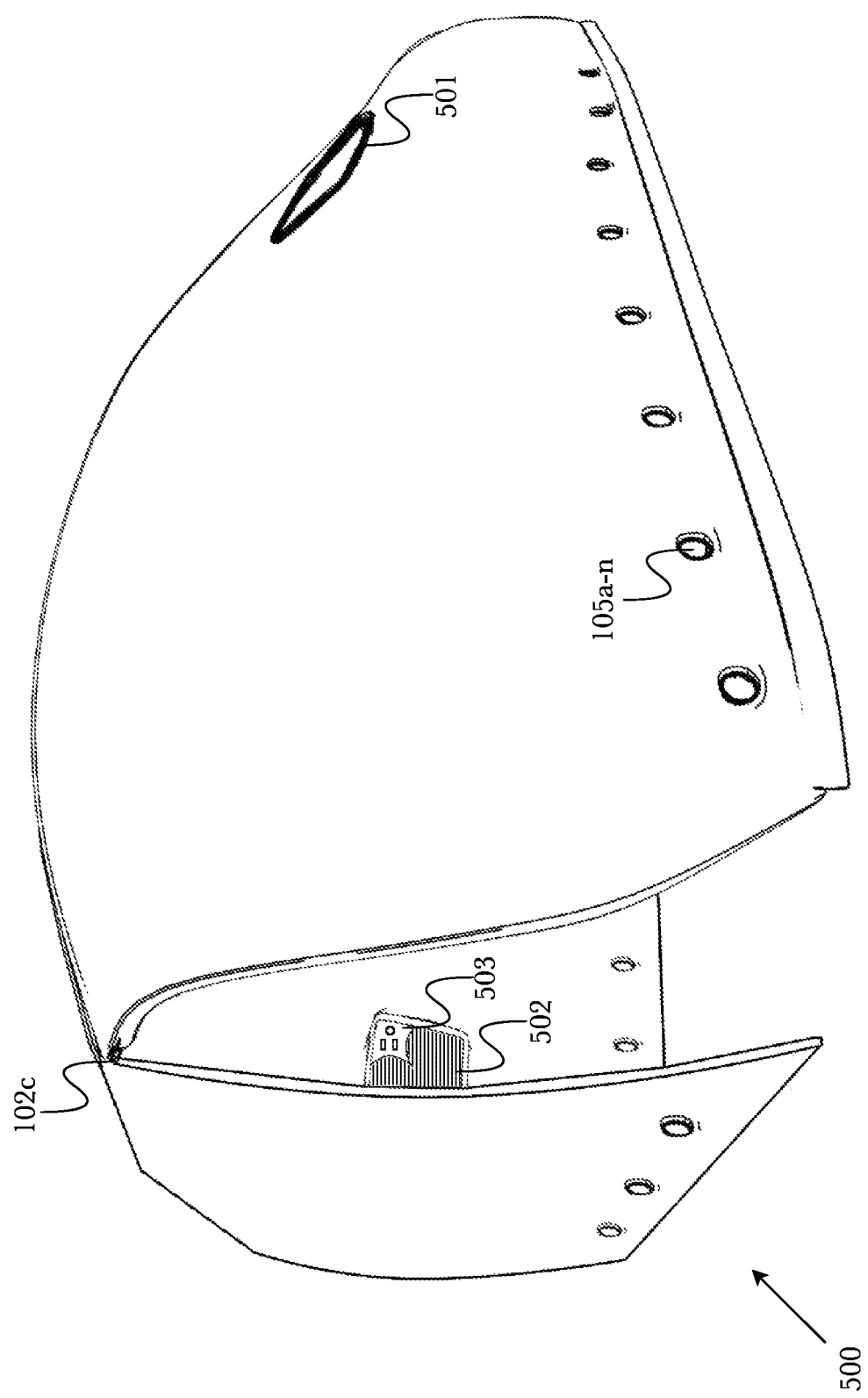
FIG. 5 is a diagram illustrating a solar-powered protective car charging cover in a tent configuration.

FIG. 5 is a diagram illustrating a solar-powered protective car charging cover in a tent configuration 500. The solar-powered protective car charging cover may be used without a vehicle for a shelter 500. The middle air tube layer provides enough rigidity for the tent 500 to stand on its own. The grommets 105a-n provide a means for securing the tent 500 with tent stakes or another tie down. The zippered corners, 102c in this case, allow access into the tent 500. Optional openings 501 may be sealed or fastened with netting, plastic windows, or other covering to protect from the weather. The electronic compartment 104 from the backside comprises a removable flap 502 where various electrical accessories 503 (e.g., charging ports, embedded or detachable lights) can be accessed. According to one embodiment, the electronic compartment 104 also comprises an inverter for use with AC powered devices and may add AC outlets to the back 503.

Figure 6:
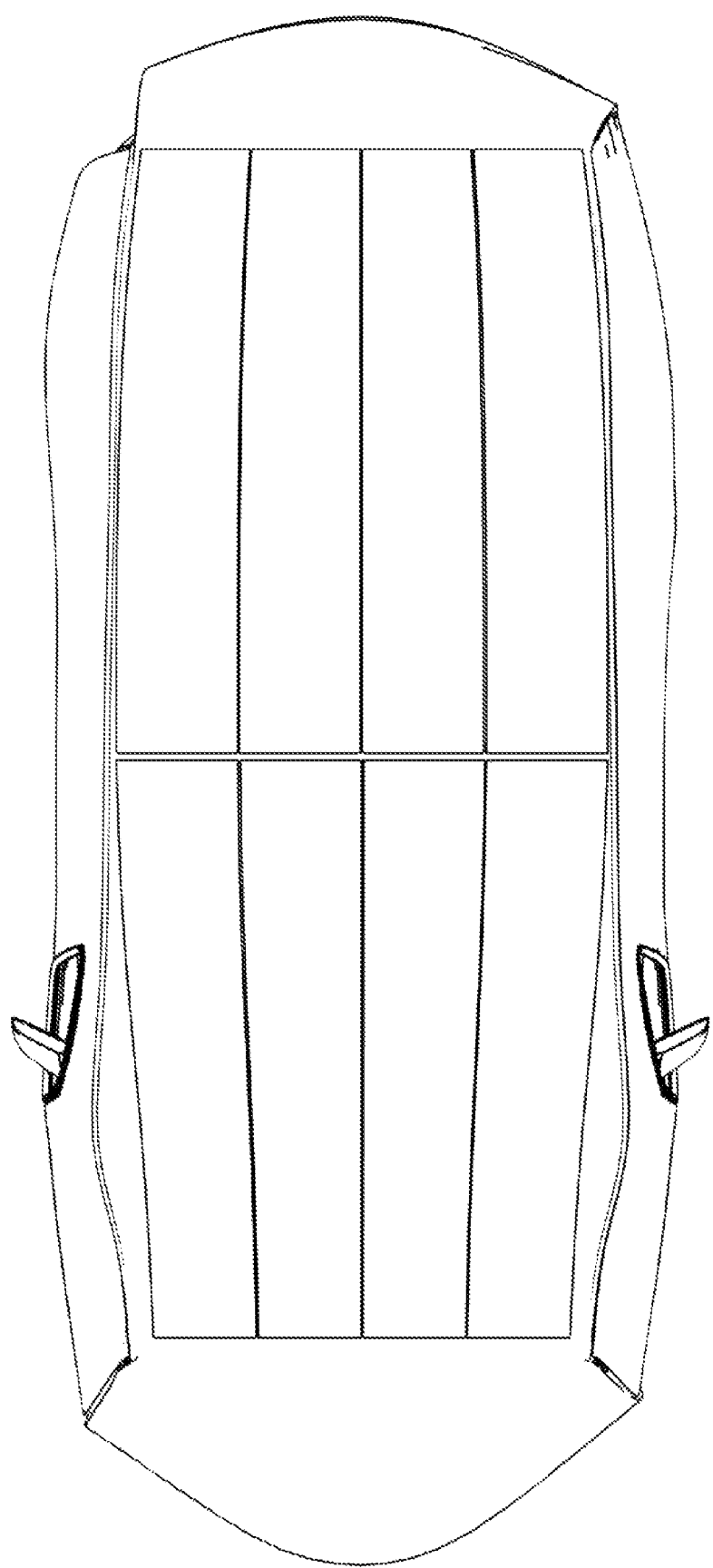
FIG. 6 is a top-down view of a solar-powered protective car charging cover.

FIG. 6 is a top-down view of a solar-powered protective car charging cover for reference. This diagram illustrates one exemplary embodiment comprising a large surface area for the solar panel array 101.

Figure 7:
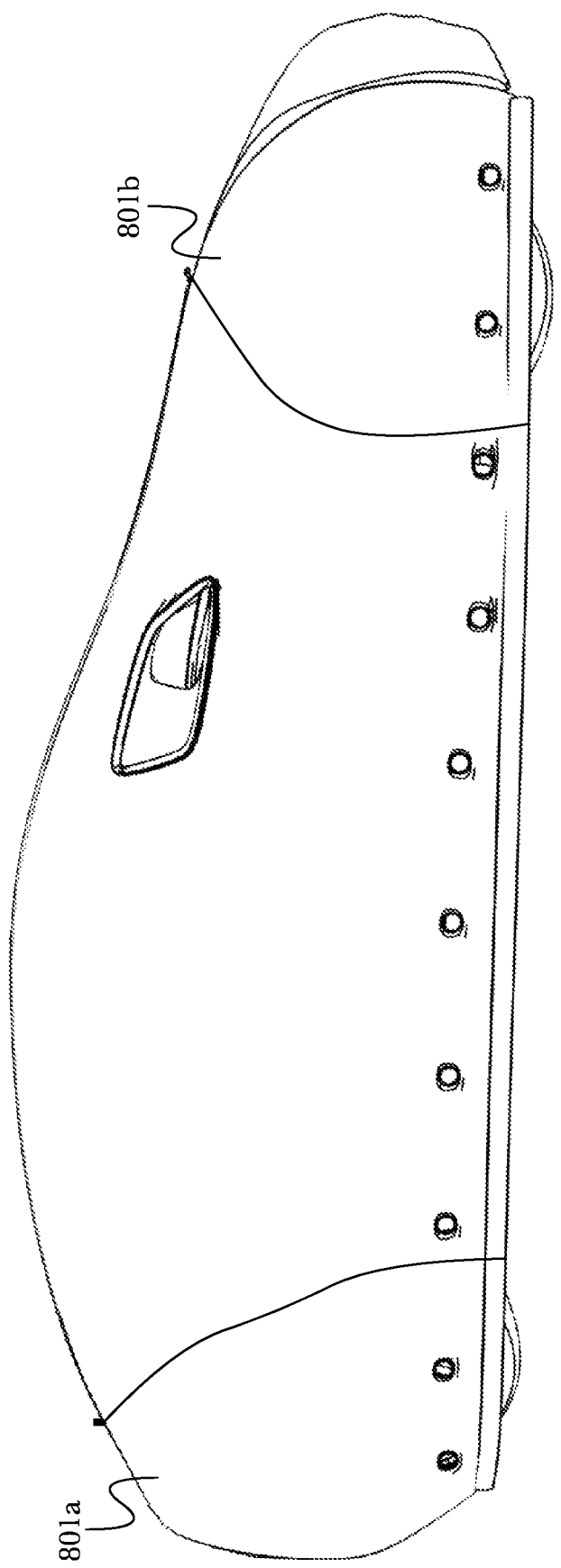
FIG. 7 is a diagram illustrating a detachable panel aspect of a solar-powered protective car charging cover.

FIG. 7 is a diagram illustrating a detachable panel aspect of a solar-powered protective car charging cover. According to one embodiment, the quarter panels 801a, 801b, 801c-d (not shown) of the car cover 100 may be detachable in order to resize the car cover 100 either for small vehicles, a smaller tent, or other application. Corners that have their quarter panel section 801a-d removed may be able to be zipped or fastened to itself so there is no longer a gap where the removed quarter panel section 801a-d was.

Additionally, manufacturing the car cover with detachable quarter panel sections 801a-d allows for different size configurations to be made by the consumer. For example, a consumer may choose to buy a small, medium, or large core center piece, i.e., the section with the solar panel array 101, and pair it with quarter panel sections 801a-d made specifically for his or her vehicle.

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for protecting and charging electric vehicles, comprising:
    a multi-layered vehicle cover comprising:
        a first outer most layer constructed of a durable weatherproof material;
        a second middle layer constructed of a network of inflatable tubes;
        a third inner most layer constructed of a durable material;
        a solar panel array attached to the first outer most layer;
            wherein one or more wires of the solar panel array are routed through the second middle layer to a charge controller; and
        an electronics compartment comprising a pouch;
            wherein the pouch comprises a plastic enclosure or a metal enclosure that houses the charge controller, a charging cable, and an air pump;
        wherein the plastic enclosure or a metal enclosure comprises an opening to connect the one or more wires to the charge controller and the network of inflatable tubes to the air pump;
            wherein the charge controller provides power to the charging cable and the air pump;
            wherein the air pump inflates the second middle layer; and
            wherein the electronics compartment is accessible from both the outside and the inside of the multi-layered vehicle cover through removable flaps.

2. The system of claim 1, wherein the solar panel array comprises flexible solar panels capable of being rolled or folded.

3. The system of claim 1, wherein the solar panel array is detachable.

4. The system of claim 3, wherein the detachable solar panel array completes the circuit to the charge controller using a pair of dual contact pads on the back of the solar panel array and the top of the first outer most layer.

5. The system of claim 4, wherein the wires of the solar panel array are routed in-between the first and second layers.

6. The system of claim 1, wherein the wires of the solar panel array are routed in-between the first and second layers.

7. The system of claim 1, wherein the electronics compartment comprises a battery pack charged by the charge controller.

8. The system of claim 7, wherein the battery pack provides extra charge when needed.

9. The system of claim 1, wherein the electronics compartment comprises an inverter for supplying alternating current.

10. The system of claim 1, wherein the electronics compartment further comprises charging ports on the front side, backside, or both.

11. The system of claim 1, wherein the multi-layer car cover further comprises an opening on either side for vehicle mirrors to protrude though.

12. The system of claim 11, wherein the openings may be sealed closed by fastening a cover along the edge of the opening.

13. The system of claim 1, wherein quarter panels of the multi-layer car cover are detachable.

14. The system of claim 12, wherein the edges of the multi-layer car cover can be fastened together after a detachable quarter panel has been removed.

15. The system of claim 1, wherein a plurality of grommets exists along the perimeter of the bottom edge of the multi-layer car cover.

16. The system of claim 1, wherein the multi-layer car cover is inflated without a vehicle inside and is rigid enough to hold its form and stand on its own.

* * * * *